(12) United States Patent
Thompson

(10) Patent No.: US 10,445,304 B1
(45) Date of Patent: Oct. 15, 2019

(54) AUTOMATIC IDENTIFICATION AND CREATION OF USER PROFILES

(71) Applicant: Cox Communications, Inc., Atlanta, GA (US)

(72) Inventor: Catherine Elizabeth Thompson, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 626 days.

(21) Appl. No.: 15/043,491

(22) Filed: Feb. 12, 2016

Related U.S. Application Data

(60) Provisional application No. 62/256,864, filed on Nov. 18, 2015.

(51) Int. Cl.
*G06F 16/22* (2019.01)
*H04L 29/08* (2006.01)

(52) U.S. Cl.
CPC .......... *G06F 16/2228* (2019.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 9,262,405 | B1 * | 2/2016 | Baliga | G06Q 30/0255 |
| 2011/0119756 | A1 * | 5/2011 | McClusky | G06F 21/6245 |
| | | | | 726/17 |
| 2014/0208268 | A1 * | 7/2014 | Jimenez | H04N 21/47202 |
| | | | | 715/811 |
| 2016/0094881 | A1 * | 3/2016 | Khatua | H04N 21/44218 |
| | | | | 725/10 |

OTHER PUBLICATIONS

K-means: Step-By-Step Example date unknown [captured by Archive.org on Nov. 26, 2011], mnemstudio.org, https://web.archive.org/web/20111126054253/http://mnemstudio.org/clustering-k-means-example-1.htm.*
TheEventHorizonX, Tutorial—How to use Netflix Profiles Aug. 7, 2013, youtube.com, https://www.youtube.com/watch?v=q8vKVtKgr7s.*
Wanderer001, New Netflix Instant Streaming Profiles Walkthrough Aug. 11, 2013, youtube.com, https://www.youtube.com/watch?v=UNWJD7s3HfY.*

* cited by examiner

*Primary Examiner* — Jason G Liao
(74) *Attorney, Agent, or Firm* — Merchant & Gould

(57) ABSTRACT

Automatic identification and creation of user profiles is provided. Interaction data for various users within a subscriber account is collected. Unique user profiles are automatically identified and created based on the interaction data. The identified user profiles are then matched against a plurality of available pre-categorized profiles. A unique set of settings and preferences may be applied to the user profile based on the matched pre-categorized profile and the collected interaction data. Personalization may be provided to the user upon establishment of the user profile. After creation of the user profile, additional user actions taken and the user's viewer history may be collected for further use. According to some aspects, when a user accesses a content item, notification is sent to the user to confirm a matched profile as an active profile. Once confirmation is received, associated settings and preferences are set according to the active profile.

19 Claims, 11 Drawing Sheets

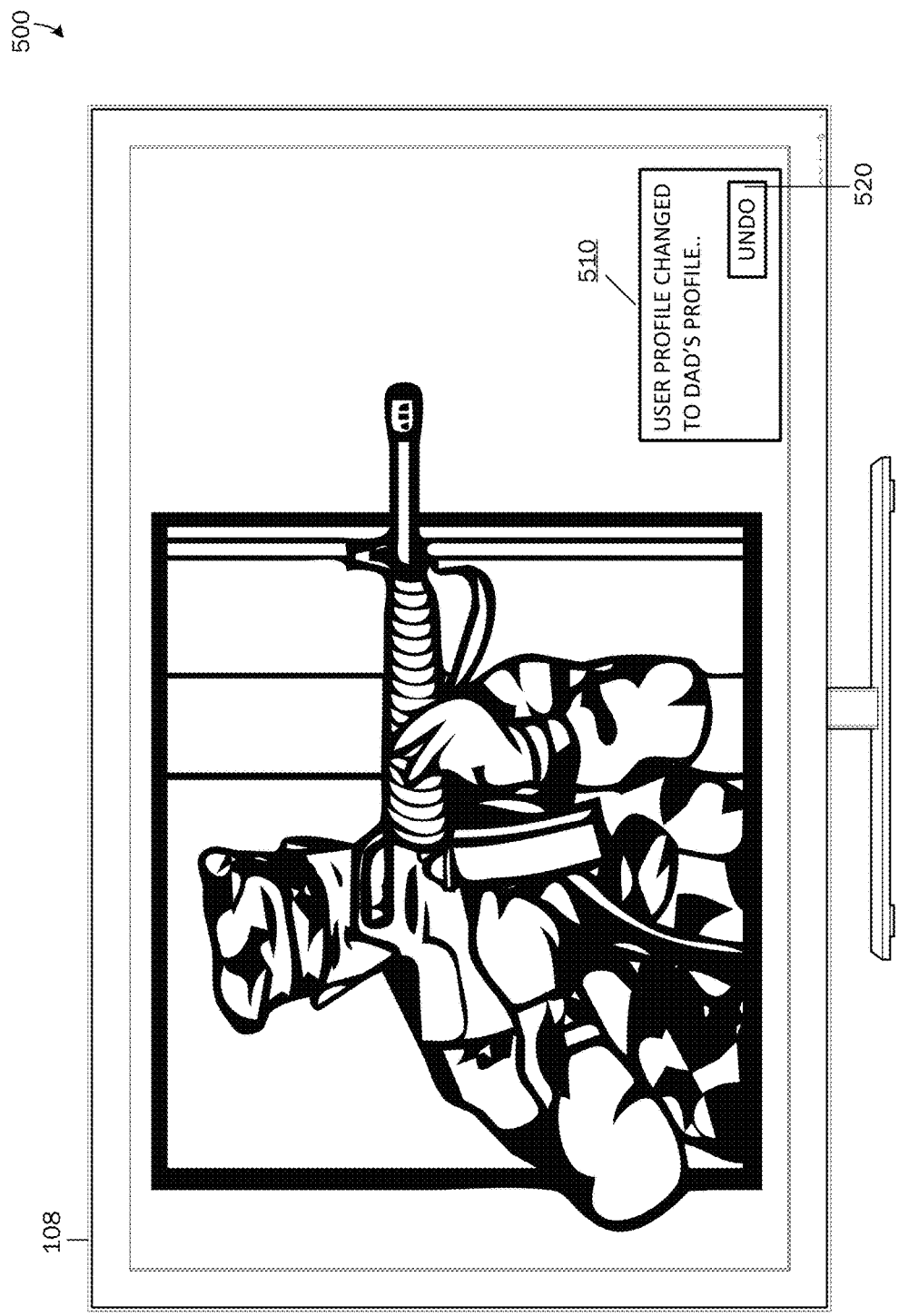

AUTOMATIC IDENTIFICATION AND CREATION OF USER PROFILES

RELATED APPLICATIONS

This application claims priority from U.S. Provisional Patent Application No. 62/256,864 titled, "AUTOMATIC IDENTIFICATION AND CREATION OF USER PROFILES" and having a filing date of Nov. 18, 2015, which is incorporated herein by reference.

BACKGROUND

A growing number of video service providers offer personalized user experiences to users. For example, a video service provider may allow users to set up unique user profiles for various users within a subscriber account. When users consume video content, they select or enter their user identification to log into their profile. As they consume video content, data is collected to build on the setup profiles for each user, wherein recommendations are provided to the users based on their viewing preferences as determined by the collected data.

As is often the case, users tend to be passive, and typically do not go through the process of creating or logging into user profiles. Accordingly, very few users benefit from the personalized user experience that is available to them.

It is with respect to these and other considerations that aspects of the present disclosure have been made.

SUMMARY

The above and other problems are solved by providing automatic identification and creation of user profiles. As the user engages in accessing content items such as by viewing content, searching for content, and performing various other interactions with various content items, user interaction data is collected. Based on the collected user interaction data, unique user profiles within a subscriber account are identified from viewer histories and created automatically without any particular input from the user. According to some aspects, when a user interacts with the client to access a content item, a notification is sent to the user to confirm a matched profile as an active profile. Once a confirmation is received, associated settings and preferences are set according to the active profile.

Accordingly, personalization is automatically provided to the user upon establishment of the user profile and without the user having to go through various steps to engage in personalization. Options are provided for enabling the user to customize a user profile. According to an aspect, to provide further personalization, the user is presented with the ability to accept or reject a pre-categorized profile as a basis for a user profile. Additionally, actions taken while a profile is active and associated viewer history data are collected and used to update the profile. According to some aspects, when enough viewing data is collected to determine recommendations, the user profile is updated to enable recommendations from a recommendation engine to be provided based on user actions, viewer history, and settings and preferences associated with the user profile.

The details of one or more examples are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout:

FIG. 5 is an illustration of an example user interface provided to notify a user in a subtle manner that the active user profile has changed;

DETAILED DESCRIPTION

Figure 1:
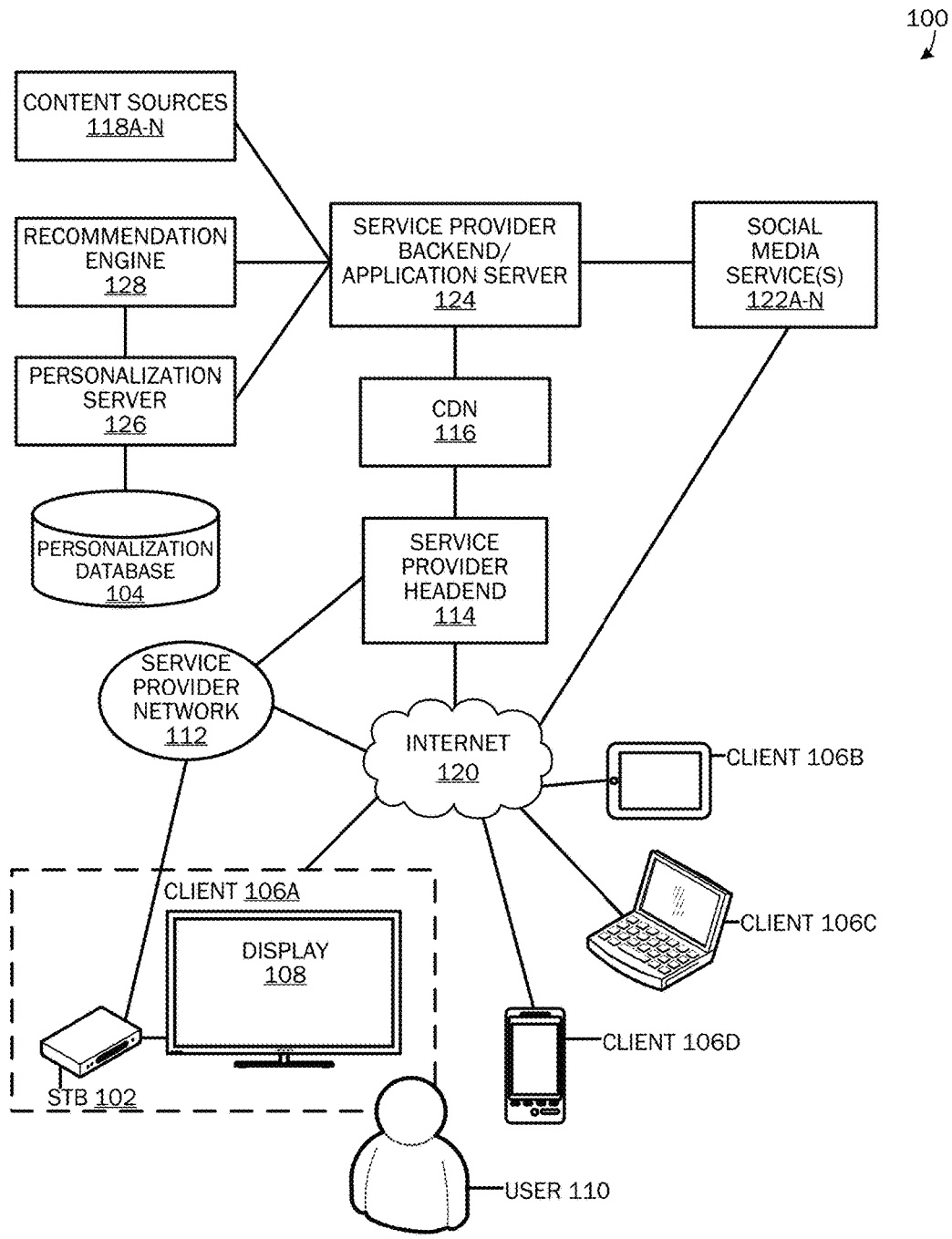
FIG. 1 is a block diagram of one example of a subscriber television system for providing automatic identification and creation of user profiles.

Aspects of the present disclosure provide automatic identification and creation of user profiles based on interaction data collected for various users within a subscriber account. As a plurality of users in a content use/consumption/viewing entity (e.g., household, business, school, club, etc.) (hereafter "household"), access various content items via a common profile, interaction data is collected. When sufficient user interaction data is collected, unique user profiles are identified and created automatically, without specific user input.

According to an aspect, the identified user profiles are then matched against a plurality of available generic pre-categorized profiles. A unique set of settings and preferences are applied to the matched user profile based on user interactions. Personalization is provided to the user upon establishment of the matched user profile. The user profile enables a personalized viewing experience, whereby a user can be given recommendations for suggested content items and actions can be automatically taken for the user (e.g., switching user profiles, configuring client settings, recording content, providing favorites lists, linking to third-party profiles, etc.).

According to another aspect, a user interface notifying the user of the matched profile is provided. Upon acceptance of the matched profile by the user, additional user actions taken by the user and the user's viewing history are collected and made available to a recommendation engine. When enough viewing data is collected to determine recommendations for the user based on user actions and viewing history, the user's user profile settings are updated and recommendations are provided based on user actions, viewing history, and settings and preferences associated with the user profile. A personalized viewing experience is automatically provided to the user upon establishment of the user profile and without the user having to go through various steps to engage in personalization. According to another aspect, options are provided for enabling the user to electively customize a user profile.

The service provider, by having a profile for the user who is consuming content remotely can present recommended content (e.g., suggested TV shows, sporting events, movies) and useful controls that are more likely to match the user's interests and needs. By automatically selecting a profile, the service provider is addressing a challenge that is particular to remote content distribution networks, where user profiles can enhance the user experience when appropriately applied, but are infrequently activated or changed by individual users who are remotely located relative to the service provider.

These examples may be combined, other examples may be used, and structural changes may be made without departing from the spirit or scope of the present invention. The following detailed description is therefore not to be taken in a limiting sense. Referring now to the drawings, in which like numerals refer to like elements throughout the several figures, examples of the present invention and an exemplary operating environment will be described.

FIG. 1 is a block diagram of one aspect of a subscriber television system 100 for providing automatic creation of user profiles. Although the aspects are illustrated and described as a cable television system, in other aspects, the subscriber television system is a satellite-based television service provider system. In yet another aspect, the subscriber television system is an Internet Protocol (IP) based service provider system or any other service provider system that is operable to provide audio, video, or a combination of audio and video content to users/subscribers for consumption via a variety of clients 106A-D. A detailed illustration and description of an example cable television services provider system is provided below with reference to FIG. 10.

The illustrated system 100 includes a client 106A-D (collectively 106), which comprises one of various configurations of client devices. In one example, a client 106A is a converter, such as a set-top box 102, and a display 108 at a physical location associated with a cable system subscriber account. In various examples, the display 108 is part of a television set. According to the illustrated example in FIG. 1, the set-top box 102 is connected to a service provider network 112, such as a hybrid fiber-coax (HFC) network, and serves as a client.

According to an aspect, the client 106 is a video client application running on a tablet computing device 106B, a desktop, a laptop, a hybrid computing device 106C, a mobile communication device 106D, a gaming device, or an IP-enabled television, etc. The service provider network 112 is connected with an IP network, such as the Internet 120. One or more social media services 122A-N (collectively 122) are accessed by the set-top box 102 via the Internet 120 and the service provider network 112.

A service provider content delivery network (CDN) 116 is illustrated in association with a service provider headend 114 and a service provider backend/application server 124. As should be appreciated, the layout of the functionalities of the service provider including the service provider CDN 116 and the service provider backend/application server 124 are for purposes of illustration only and are not restrictive of the various layouts and combinations of systems that are used by a given service provider for providing content to users 110.

A service provider backend/application server 124 provides functionality for creating and maintaining profile information on the user 110, including permissions for the user 110 to use service provider functionality including consumption of service provider content and including such settings as content preferences, parental control systems, billing systems, and the like. The backend/application server 124 for the service provider provides operating functionality, for example, one or more software applications and associated databases for directing content distribution provided by the service provider to clients 106.

According to an aspect, the service provider CDN 116 is illustrative of a delivery or distribution network which includes a distributed system of servers, databases, and other content repositories for distributing audio and video content, text, graphics, media files, software applications and associated documents, on-demand content, social media content, live streaming media content, and the like from the service provider to users 110. CDNs 116 typically function by receiving requests from clients 106, checking a local cache for a copy of the requested resource, or querying some source if a requested resource is not in the cache or has expired, for example. CDN servers can be strategically located at the edges of various networks to limit loads on network interconnects and backbones. CDN servers can be redundantly deployed and interact with other CDN servers to respond to content requests from clients 106 in attempts to optimize content delivery. For example, network edge servers can enable ease of browsing, navigating and streaming of content, including streaming live video. For example, if a given user 110 operating a tablet computing device 106B selects a news story for live streaming to the tablet computing device 106B as offered by the service provider, the backend/application server 124 causes a media player to activate for streaming the desired content from the service provider CDN 116 to the tablet computing device 106B via IP-based transmission.

The service provider gathers content from a variety of content sources 118A-N (collectively 118) including network feeds, stored media, communication links, video on demand sources, Internet sources, and live studio sources. The service provider headend 114 converts the content into a form that can be managed and distributed, then stores, moves, and sends out (playout) the media at scheduled times. The service provider network 112 simultaneously transfers multiple channels to users 110 who are connected to the service provider system. Users 110 view video content on displays 108 (e.g., televisions) that are directly connected to a cable line (e.g., cable ready TVs) or through an adapter box (e.g., set-top box 102). According to an aspect, video content is provided to clients 106 via use of IP networks (e.g., the Internet 120), which are used to process and receive multimedia communications using IP-based transmission.

The system 100 comprises a personalization server 126 and a personalization database 104. As should be appreciated, the layout of the personalization server 126 and the personalization database 104 are for purposes of illustration only, and are not restrictive of the various layouts and combinations of systems that are used by a given service provider for a personalization system. In one example, the personalization database 104 is centrally located on a network, or in another example, it is located locally on a client 106, and is comprised of one or more databases. According to an aspect, the personalization database 104 is a common database and is accessed directly by multiple servers, or according to another aspect, it is accessed directly by multiple clients 106. According to another aspect and as illustrated in FIG. 1, the personalization database 104 is a specific database used by a single server (i.e., the personalization server 126) or a single client 106.

The personalization database 104 is operable to receive user interaction data via the backend/application server 124, and identify, create and store one or more user profiles. According to an aspect, the personalization database 104 is also operable to receive and store one or more generic pre-categorized profiles with unique sets of settings and preferences. For example, with the vast amount of user data available, a service provider has a general idea on the types of users in a typical household (e.g., a "mom" user, a "dad" user, a "kid" user, a "drama fan" user, a "sports nut" user, etc.).

According to an aspect, as user interaction data is received, the personalization server 126 is operable to identify and create blank user profiles. The personalization server 126 is operable to match the blank user profiles against the available generic set of pre-categorized profiles.

Once it is identified by the personalization server 126 that user interaction data matches a specific pre-categorized profile, personalized recommendations are provided. For example, when user interaction data is received by the personalization server 126 and it is identified that the user interaction data and viewing patterns best match a "mom" user profile, then recommendations are provided to the client 106 accordingly. The generic set of pre-categorized profiles are stored in the personalization database 104.

According to an aspect, once a match is identified by the personalization server 126, a user interface is provided to a user 110 via the client 106, notifying the user 110 of the matched pre-categorized profile. The confirmation of the matched, pre-categorized profile by the user 110 is communicated to the personalization server 126. Accordingly, settings associated with the matched, pre-categorized profile are applied to the user's profile and communicated to the client 106.

According to an aspect, the client 106 is operable to record actions taken by the user 110 (e.g., search terms used, items selected from a search list, video content watched/recorded, etc.). The recorded actions are communicated to the personalization server 126, and tracked as actions associated with the user's profile. That is, the user's profile comprises preference data determined by the recorded actions of the user 110 in addition to the settings associated with the pre-categorized profile. The actions of the user 110 combined with the matched user profile settings are fed to a recommendation engine 128 to provide the user 110 with recommendations and to provide the user 110 with targeted advertisements related to what the user 110 likes.

According to an aspect, an ad insertion system is implemented to fill empty advertising slots or to replace existing advertising with ads that are more personally tailored to the user 110 according to user viewing data, settings, or the user's location.

Figure 2:
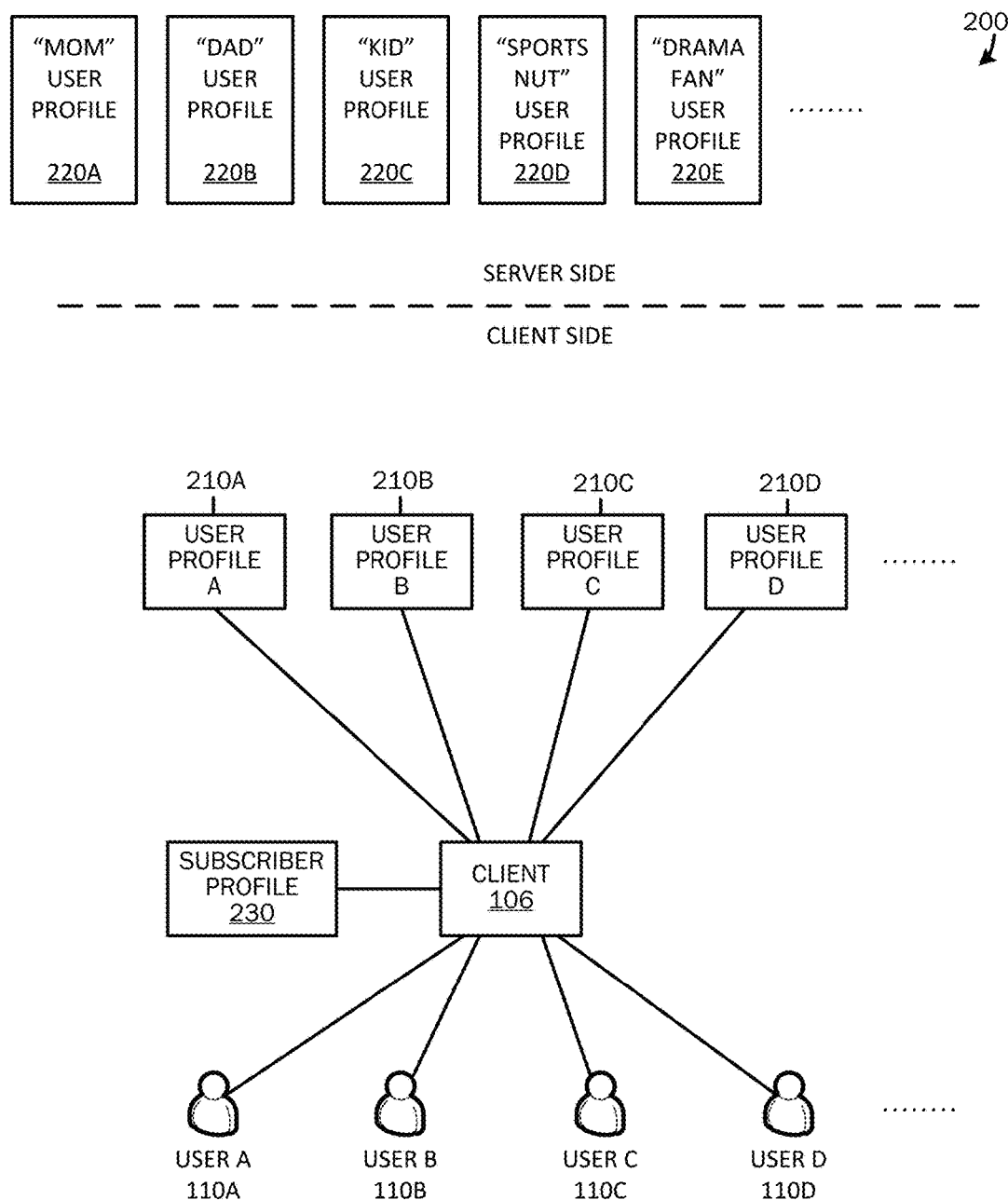
FIG. 2 is an illustration of an example block diagram to illustrate an environment for the identification and creation of unique user profiles from a plurality of generic pre-categorized profiles available to the service provider.

FIG. 2 is an illustration of an example block diagram to illustrate an environment 200 for the identification and creation of unique user profiles from a plurality of generic pre-categorized profiles available to the service provider. Users 110A, 110B, 110C, 110D (collectively 110) interact with one or more client(s) 106 to access their subscriber account under a common profile. As they interact with their subscriber account, and when sufficient interaction history is collected by the system, unique user profiles 210A-D (collectively 210) are created based on the users' unique viewing patterns. User profiles 210A-D represent four unique individuals residing in the household and accessing a common subscriber profile 230 for the household account. The identified user profiles 210A-D are then matched against a plurality of generic pre-categorized profiles 220A-E (collectively 220), available to the service provider. For example, if user 110A watches cartoons on Saturday mornings and weekday afternoons, user profile 210A is matched with a "kid" pre-categorized profile 220C. According to an example, "kid" pre-categorized profile 220C comprises various subcategories of "kid" user profiles such as kids under 2 years, 2-5 year old girls, 2-5 year old boys, 5-7 year old girls, 5-7 year old boys, etc., to which user 110A may be further matched to.

As will be understood, more or fewer users than users 110A-D shown in FIG. 2 may be present in a household to be provided with user profiles 210. Until users 110A-D are identified and users profiles 210A-D created (and one of which is set as an active profile), the subscriber profile 230 is used as a default profile according to some aspects. As will also be understood, the generic pre-categorized profiles 220 discussed herein are provided as easily understood examples of generic pre-categorized profiles 220 and a service provider may provide any number of generic pre-categorized profiles 220 with varying levels of nuance in their categorization, naming, and matching.

Figure 3:
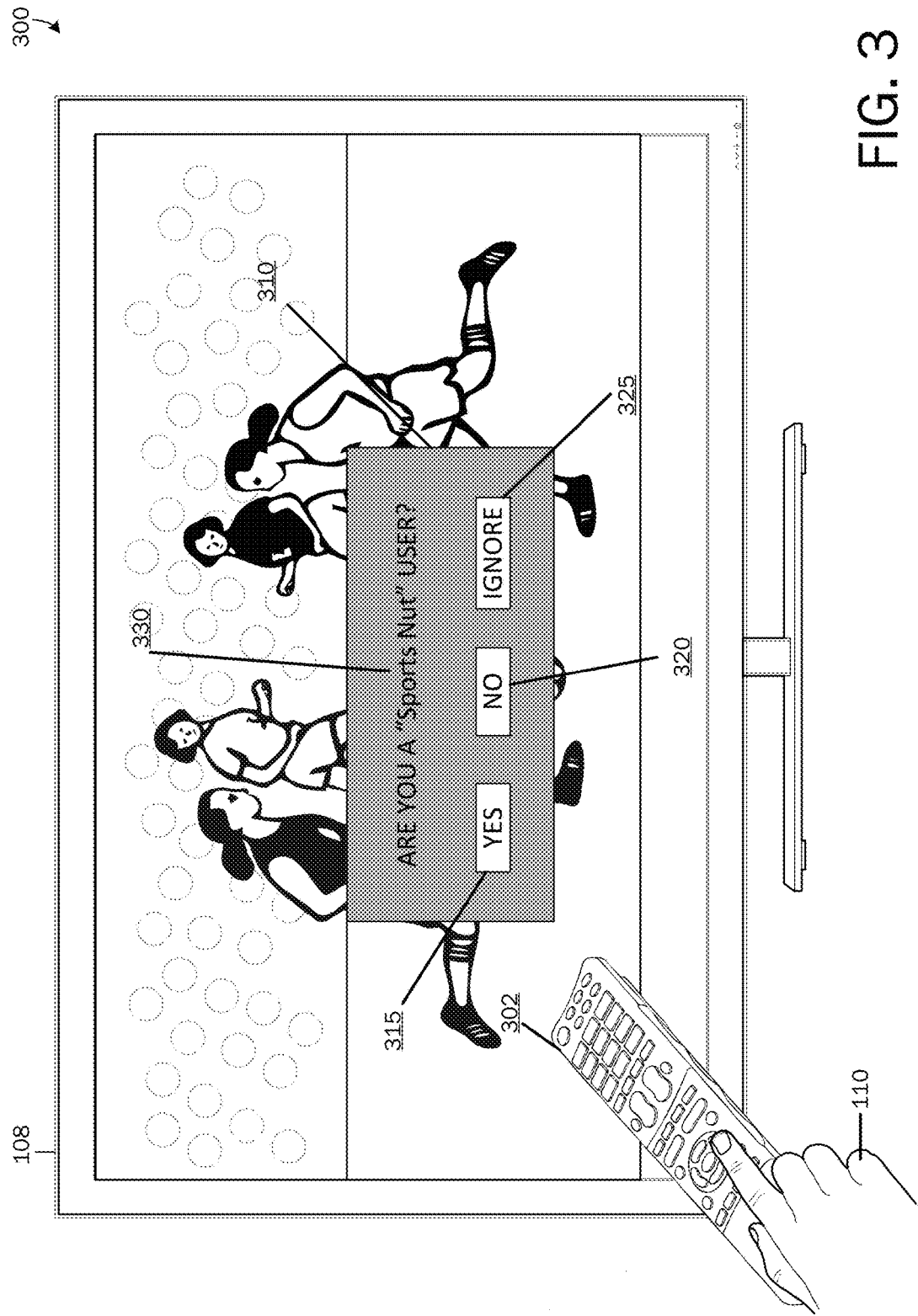
FIG. 3 is an example user interface to provide notification to and receive confirmation from the user whether the user accepts belonging to the pre-categorized profile matched by the system.

FIG. 3 is an example user interface 300 to provide notification to a user 110 and take confirmation from the user 110 whether the user 110 accepts belonging to the pre-categorized profile 220 matched by the system. According to an aspect, as a user 110 interacts with the system (e.g., viewing a guide, recording/viewing a video content item, etc.), user interaction data is collected. When sufficient user interaction data is collected, a user interface 310 as illustrated in FIG. 3 is provided to notify the user 110 to confirm whether the user 110 accepts belonging to a suggested pre-categorized profile 220. A user 110 can interact with the user interface 310 via several methods, including remote control 302, controls built into the client 106 (e.g., touchscreens, buttons, keypads, etc.), and via other control schemes known to those skilled in the art.

For example, a family comprising a mom, a dad, a teenager, and a young child, corresponding to users 110A-D, may be viewing various content items under a common subscriber profile 230 for a household account. If and when a sufficient amount of user interaction data is collected, the system creates unique user profiles 210A-D for all of the users 110A-D in the household. Once the unique user profiles 210A-D have been created, a presented pre-categorized profile 330 is identified for the active unique user profile 210A-D matched from one of the pre-categorized profiles 220 available to the service provider. In one example, the mom user 110A is matched with a "mom" pre-categorized profile 220A, the dad user 110B is matched with a "dad" pre-categorized profile 220B, the teenager user 110C is matched with a "kid" pre-categorized profile 220C, and the young child user 110D is matched with a "kid" pre-categorized profile 220C. In another example, the mom user 110A is matched with a "sports nut" pre-categorized profile 220D, the dad user 110B is matched with a "drama fan" pre-categorized profile 220E, the teenager user 110C is matched with a "dad" pre-categorized profile 220B, and the young child user 110D, who does not watch sufficient television to create a profile, does not have a user profile created to match with, and may instead use subscriber profile 230 until sufficient data is collected. Once the match has been determined, when the user 110 interacts with the system, a user interface 310 is provided on the display device asking for input from the user 110 to confirm the presented pre-categorized profile 330. If the user 110 confirms the match by selecting the option YES 315, the system acknowledges the confirmation as approving the presented pre-categorized profile 330. The system continues to enhance the user's user profile 210 automatically as further user interaction data from the user 110 is collected.

According to an aspect, the selection of the option NO 320 by the interacting user 110, clears the user profile 210 that was identified and created automatically and reverts to the previously active profile as the active profile. The system continues to collect more interaction data to further identify and create a replacement user profile. According to another aspect, the selection of the option IGNORE 325 by the interacting user 110, closes the user interface 310 and lets the system continue to collect more interaction data.

In other aspects, after the unique user profiles 210 have been created and matched against pre-categorized profiles 220, the user interface 300 presents the user 110 with the name of the user profile 210 instead of the name of the presented pre-categorized profile 330 when the system has been triggered to switch to a different profile as the active profile. For example, the mom user 110A (associated with user profile 210A, named "Mom," based on a "sports nut" pre-categorized profile 220D) is presented with user interface 300 which prompts her whether she is the user 110 associated with user profile 210A instead of asking her whether she is a "sports nut" type user after her profile has been established. If confirmed, the system then enables the presented user profile 210A as the active profile. If rejected or ignored, the system retains the current active profile as the active profile.

Figure 4A:
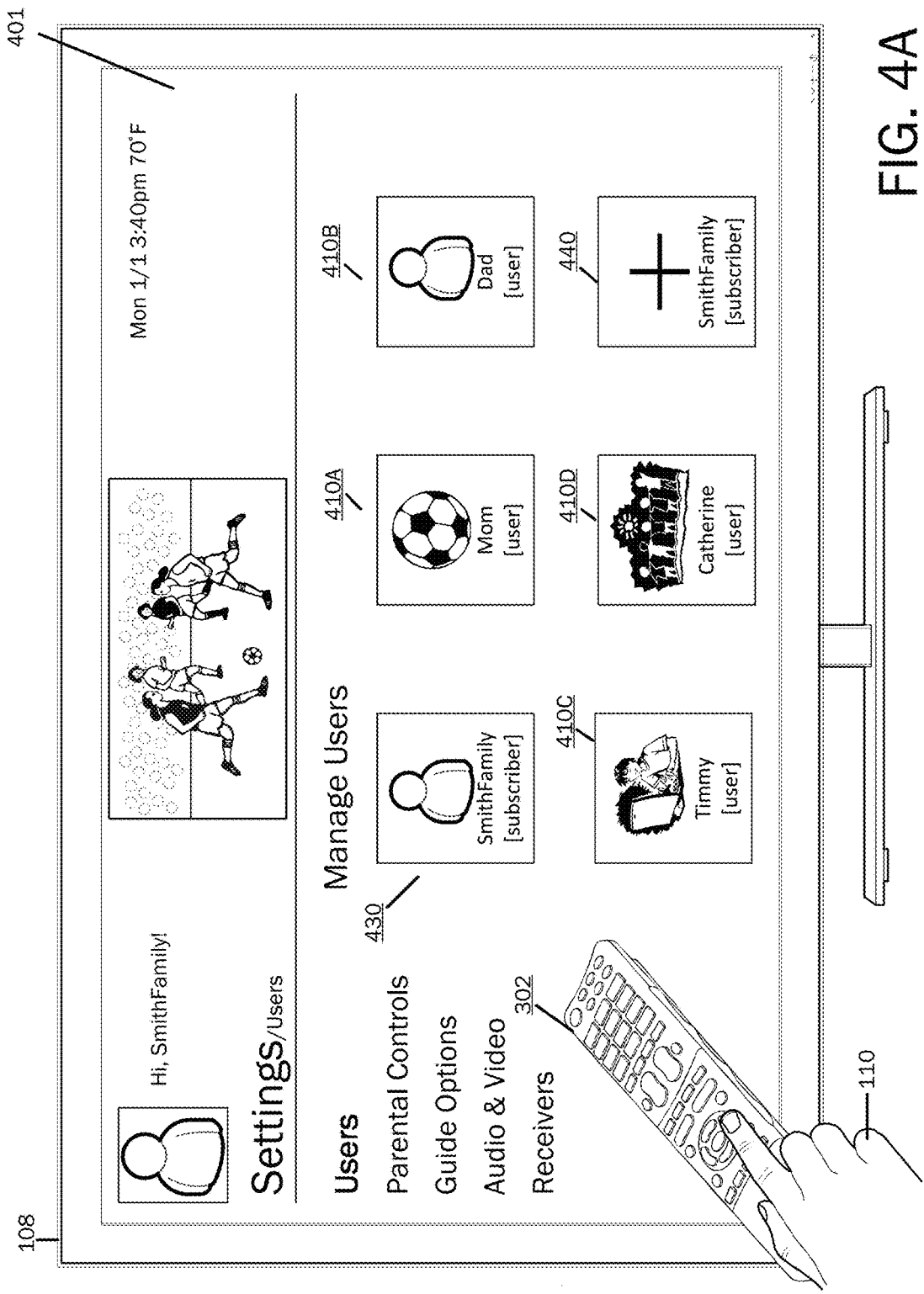
FIG. 4A is an example user interface via which a user can manage user profiles associated with a subscriber account.

FIG. 4A is an example user interface 401 via which a user 110 manages user profiles 210 associated with a subscriber profile 230. The user interface 401 is accessed via a menu, or via a feature of a programming guide. As illustrated, the user interface 401 comprises a display of option 430 for accessing a common profile, for example, the "SmithFamily" subscriber profile 230 and options 410A-D for accessing corresponding user profiles 210A-D that have been automatically identified and created by the system from the user interaction data. Additionally, the user interface 401 comprises an option 440 to create a custom user profile for a user 110.

Figure 4B:
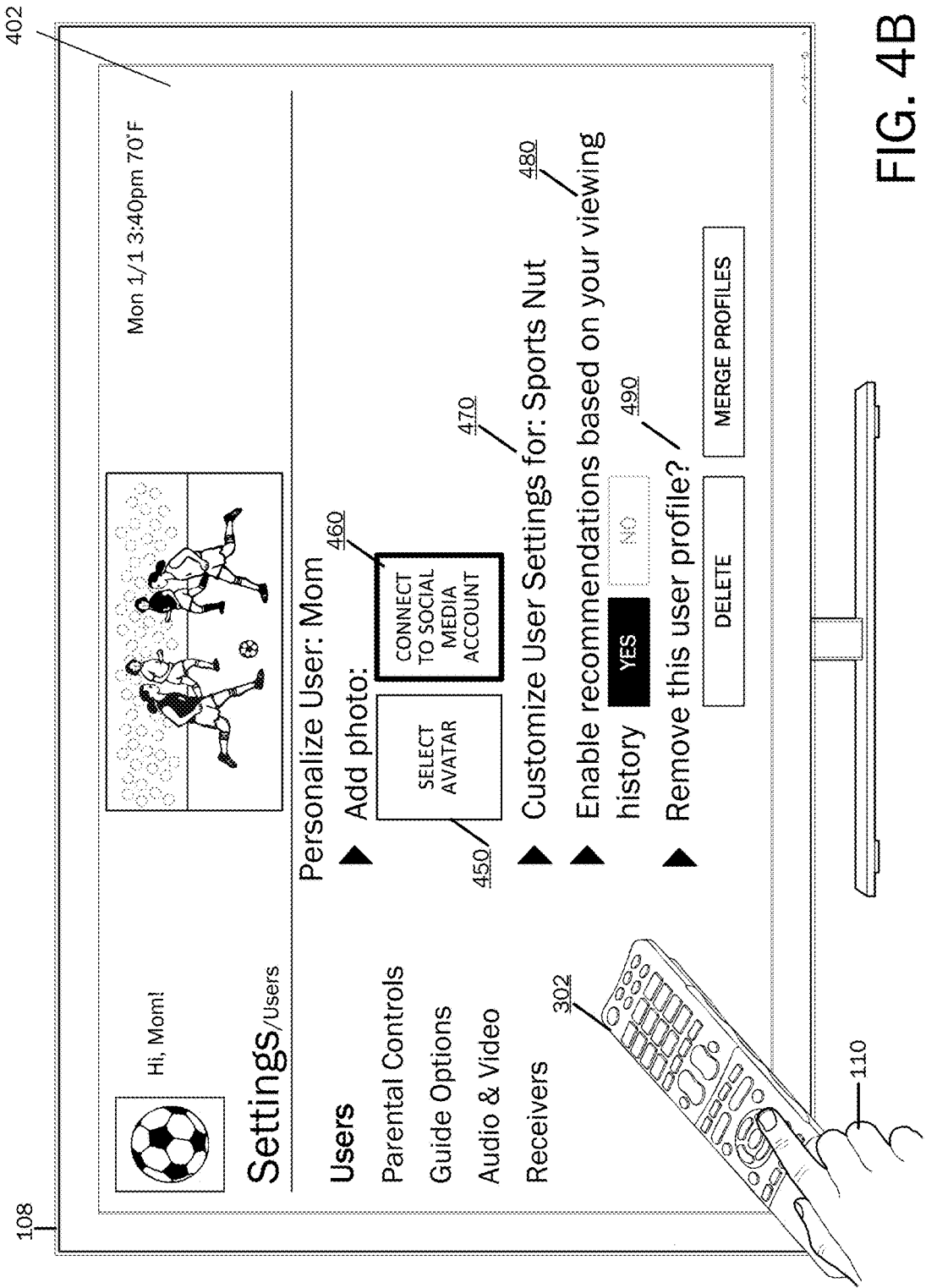
FIG. 4B illustrates a user interface via which the user can further customize a user profile.

According to another aspect, a user interface to provide further personalization of the selected user profile 210 is provided, as illustrated in FIG. 4B. For example, once a user 110 confirms that she is the user "Mom" 110A by, for example, selecting the option YES 315 from user interface 310 from FIG. 3, she is presented with a user interface 402 to allow further personalization of the confirmed user profile 210A associated with the mom user 110A. As illustrated in FIG. 4B, for example, an option 450 is provided to allow the selection of an avatar for a user profile 210A. Additionally, an option 460 is provided to allow the user "mom" 110A to connect to a social media account and link a photograph from her social media account to her user profile 210A. Further, an option 470 is provided for changing or adding settings or preference data associated with the matched pre-categorized profile 220, for example, if the mom user 110A wishes to change or add a content rating setting associated with the selected user profile 210A.

According to an aspect, once a user profile 210 is created, any further user interaction data collected is applied to the user profile 210 when that user profile 210 is active, to update and improve the user profile 210. Any further user interaction data, and the associated currently-viewed content items, are indexed and categorized in relation to the active profile so that each unique user profile 210 has a corresponding viewer history. In this manner, a personalized user experience can be updated as more user interaction data is collected. For example, when user profile 210A (originally matched with a "Mom" pre-categorized profile 220A) is the active profile, user interaction data and the currently-viewed content items will be categorized and indexed in relation to user profile 210A. The viewer histories associated with inactive user profiles 210B-D will remain unaffected. According to aspects, the viewer history associated with the subscriber profile 230 may or may not be affected by the user interaction data received while a user profile 210 is set as the active profile. User profile 210A is thereby updated to provide a more nuanced and tailored personalized viewing experience than the pre-categorized profile 220A on which it was based. For example, if user 110A enjoys content items that are not part of the pre-categorized profile 220A and the viewer history associated with user profile 210A reflects that, the system may update user profile 210A so that user profile 210A will activate when those content items are selected and enable recommendations for similar content items in the future.

According to an aspect, an option 480 is also provided to enable the user 110 to select whether to enable or disable the provision of recommendations based on user actions and viewing history. For example, if the user 110 chooses to disable recommendations based on user actions and viewing history, any recommendations provided to the user 110 are based solely on the settings associated with the pre-categorized profile 220. In other aspects, the user 110 may completely disable the presentation of recommendations, although the system may still track recommendations and whether the user self-navigates to the content items that would have been presented.

According to another aspect, an option is provided for automatically recording recommended content. For example, a recommendation determined by the recommendation engine 128 is automatically recorded to a DVR or other storage device.

According to another aspect, by selecting option 490 to remove the selected user profile 210, the selected user profile 210 can be deleted or merged with a different user profile 210. When merging user profiles 210, a separate user interface is provided in various aspects to allow the selection of a second user profile 210 to merge with or to resolve any conflicts (e.g., each user profile 210 has a different volume preference). When merging user profiles 210, the triggers, preferences and settings, and recommendation keys associated with each selected user profile 210 are consolidated into the combined profile and the viewer histories associated with each user profile 210 are similarly consolidated and associated with the combined profile. For example, when a user 110A both watches cartoons in the morning and watches the news at night, the system may build two viewer histories for the cartoon-watching and news-watching viewing patterns and create two corresponding user profiles 210A, 210B. In this example, user 110A may wish to consolidate the two viewing patterns into a single viewing pattern and similarly consolidate the user profiles 210A, 210B. Aspects allow the system to merge the user profiles 210A, 210B into an existing profile (e.g., user profile 210B merges into user profile 210A) or to create a new user profile 210C into which the user profiles 210A, 210B are merged. Aspects allow for a user profile 210 from which triggers and recommendation keys are added from to then be deleted.

FIG. 5 is an illustration of an example user interface 500 that is provided to notify a user 110 in a subtle manner that the active user profile 210 has automatically changed. For example, a mom user 110A is viewing a video content item on a client 106. When the mom user 110A changes the channel, the system will check to see if the newly selected content item is associated with the mom user's user profile 210A. For example, if the mom user 110A has a "sports nut" pre-categorized profile 220D and selects a channel providing a soccer game, or that will provide a soccer game after the current content item is complete, the system will maintain the mom user's user profile 210A as the active user profile. However, continuing the example, if the mom user 110A selects a channel providing a war drama content item not associated with the pre-categorized profile 220D, the system provides user notification 510 as a subtle notification to the mom user 110A that the active user profile has been changed from the mom user's "sports nut"-based user profile 210A to the dad user's 110B "drama fan"-based user profile 210B to which the war drama content item does correspond. Aspects of the system allow the change to be immediate or to be delayed for a predetermined time (e.g., 5 s, 10 s, 30 s, etc.) to allow for "channel surfing" to not affect viewer history or which user profile 210 is active. According to an aspect, an UNDO option 520 is also provided in cases where the channel change is performed in error by the user 110 or if the user 110 wants to have viewing the content item affect the user's corresponding viewer history.

Figure 6:
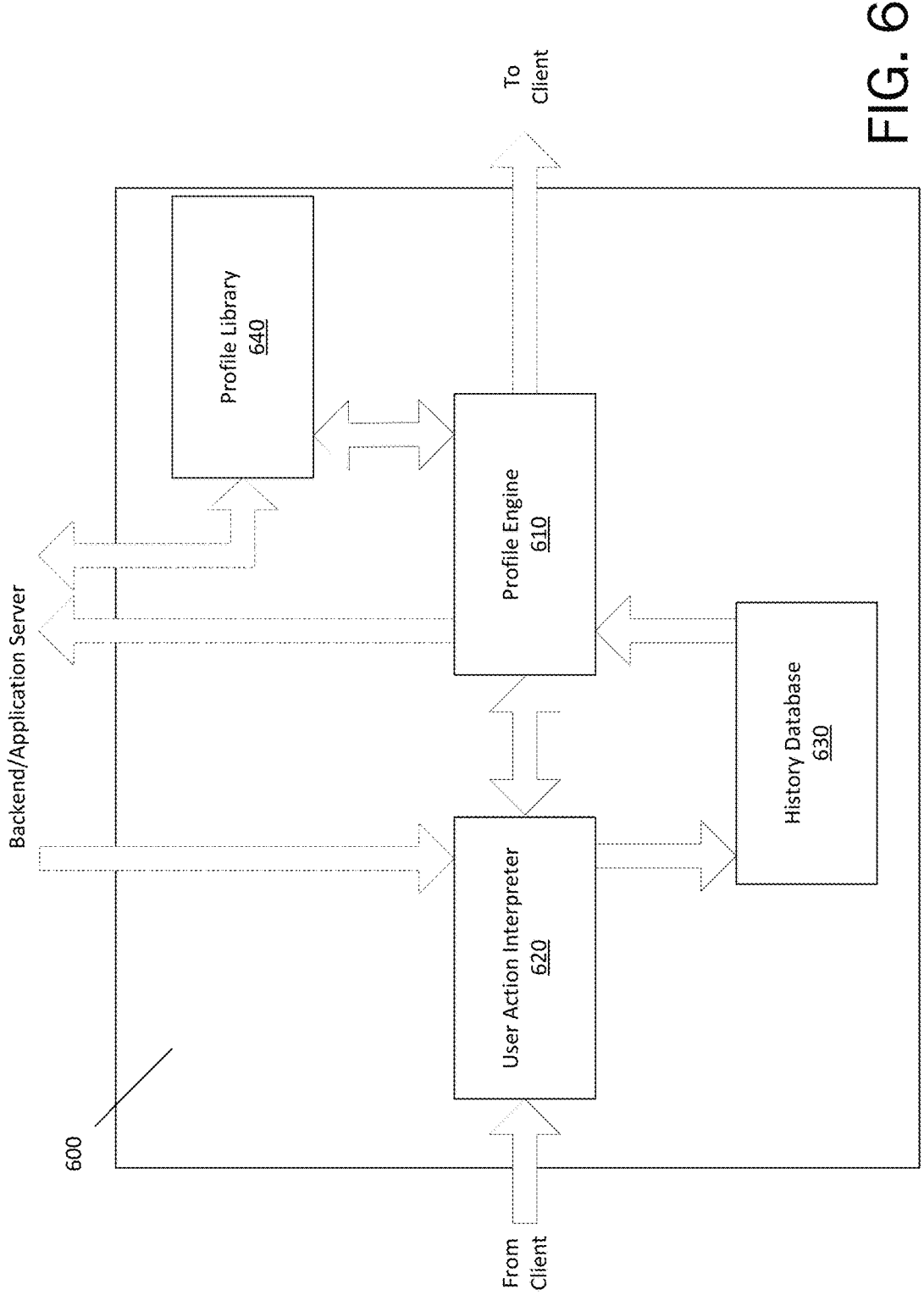
FIG. 6 is a high-level block diagram illustrating one aspect of a system for automatically providing user profiles.

FIG. 6 is a high-level block diagram illustrating one aspect of a system 600 for automatically providing user profiles 210. In system 600, the User Action Interpreter 620 receives and parses data from a client 106. The parsed data is sent to a History Database 630, which is operable to collect parsed data over a period of time to build a viewer history. Profile Engine 610 receives parsed data from User Action Interpreter 620 and History Database 630 to choose a profile to set as the active profile. The profiles available to Profile Engine 610 are stored by Profile Library 640 and include pre-categorized profiles 220 and user profiles 210. As is understood, system 600 may be implemented in hardware, software, and combinations thereof, and may be implemented on a client 106, on a backend/application server 124, or independently as part of a service provider network 112, and may be implemented as a discrete or distributed system.

The User Action Interpreter 620 is operable to receive and parse data from a client 106. Data from the client includes user interaction data, subscriber account information, an active profile (e.g., subscriber profile 230 or user profile 210), and an indication of a currently-viewed content item. Subscriber account information includes the subscriber profile 230, user profiles 210 associated with the subscriber profile 230, and permissions associated with the subscriber profile 230 (e.g., which channels the subscriber account has access to, account settings, information on associated devices, download speeds, etc.). To interpret the data from the client 106, the User Action Interpreter 620 is operable to communicate with a backend/application server 124 or receive an indication from the client 106 indicating metadata associated with the currently-viewed content item. Such metadata is used to categorized the currently-viewed content item and includes, but is not limited to: a content rating (e.g., TV-G, PG-13, live, unrated, etc.), genre information, cast information, crew information, title, relationship data to other content items (e.g., status of: part of a series, a spin-off, a sequel, etc.), date of premiere, critical reception (e.g., 4/5 stars, etc.), and the like.

The History Database 630 collects the parsed data from the User Action Interpreter 620 over a period of time to build a viewer history. Viewer histories are built from collecting and indexing indications of currently-viewed content items, the categories of the content items, user interactions with the content item, the times of access to the content items, and the active profile that accessed the content items. This data is collected over a period of time to collect historical user interaction data and historical content items. An initial viewer history is built for a subscriber profile 230. When user profiles 210 are created, separate viewer histories are created for each user profile 210 so that a viewer history associated with user profile 210A is independent from the viewer history associated with user profile 210B; what user 110A watches does not affect user 110B's viewer history and vice versa. Aspects of History Database 630 allow for the viewer history associated with the subscriber profile 230 to be updated alongside viewer histories associated with user profiles 210 so that what user 110A watches, even while user profile 210A is active, affects both the viewer history associated with subscriber profile 230 and the viewer history associated with user profile 210A. Other aspects allow for the viewer history associated with the subscriber profile 230 to be unaffected when a user profile 210 is active so that when user profile 210A is active, only the viewer history associated with user profile 210A is updated.

The Profile Engine 610 is operable to create, match, and set a user profiles 210 as an active user profile for a client 106 in response to receiving an indication from the User Action Interpreter 620 of a user interaction. A user interaction in some aspects indicates that a user 110 has selected (or approved a system selection of) a user profile 210 to be the active profile, at which time the Profile Engine 610 will set the active profile and transmit the user profile 210 to the client 106 for use. In other aspects, the Profile Engine 610 sets the active profile and transmits an indication of the active user profile to the backend/application server 124, but not to the client 106, for the use of the user profile 210 by the backend/application server 124. The user profile 210, according to different aspects, can be a user-defined or custom profile, a system defined or pre-categorized profile 220, a viewer-history based profile, or some combination thereof. According to aspects of the system 600, user profiles 210A-D may be created by a user 110 by manual input or by the Profile Engine 610 by a trend analysis of the viewer history(ies) stored by the History Database 630. When distinct viewing patterns are detected in the trend analysis, the Profile Engine 610 creates a new user profile 210A associated with the subscriber profile 230 based on the viewing patterns in the viewer history and transmits the profile to a client 106 for approval.

Aspects of the system 600 allow for the new user profile 210A to be matched against a pre-categorized profile 220 from a set of pre-categorized profiles 220A-E to build a unique user profile 210 by using the pre-categorized profile 220 as a base. Aspects of the Profile Engine 610 are operable to expand on the pre-categorized profiles 220 used to create the user profile 210, thereby refining the user profile 210. For example, when viewer history associated with a subscriber profile 230 is analyzed and patterns for watching cartoons from 3 p.m. to 5 p.m. on weekdays and for watching the news from 10 p.m. to 11 p.m. on weekdays is detected, two user profiles 210A, 210B are created by the Profile Engine 610.

User interactions are compared with the viewer history to determine whether the Profile Engine 610 triggers a change in the active profile. User interaction with the client 106 to change a setting (e.g., channel, volume, manual change of active profile, etc.) or to access the device at a particular time can serve as a triggering user interaction when the viewing history supports a statistical significance to that user interaction. In one example, where the History Database 630 has noted in associated viewer histories that user 110A watches the news late at night, at low volume and user 110B watches cartoons during the day at high volume, the Profile Engine 610 is operable to use a change in volume, the time of day, or the genre of the currently-viewed content item, alone or in combination, as a trigger to change between user profile 210A and user profile 210B as the active profile. The trigger is used to change the active profile to a profile matched with that trigger. Continuing the example, lowering the volume, accessing content at night, and accessing "news" genre content items are triggers that Profile Engine 610 matches to user profile 210A, whereas raising the volume, accessing content in the afternoon, and accessing "cartoon" genre content items are triggers that Profile Engine 610 matches to user profile 210B. As multiple user profiles 210 may be matched with the same trigger (e.g., a common genre, common time of access, etc.), Profile Engine 610 is operable to maintain the current active profile until a trigger not associated with the active profile (i.e., a distinct trigger) is received.

The Profile Library 640 stores profiles for selection by Profile Engine 610. Pre-categorized profiles 220, according to some aspects, are pre-loaded into the Profile Library 640 as generic profiles for the Profile Engine 610 to choose from. The Profile Library 640 is also operable to store user-created or custom profiles and system-created profiles for each user 110. Aspects allow for each stored user profile 210 and subscriber profile 230 to be edited by the Profile Engine 610. Profiles include trigger information, to enable the Profile Engine 610 to determine whether to set a profile to the active profile, settings and preferences for the user, to configure the client 106 and services to the user's liking, and recommendation keys, to enable the client 106 to provide the user 110 with content or advertisements of higher relevance to the user 110. For user profiles 210 and subscriber profiles 230, trigger information, settings and preferences, and recommendation keys may be set manually by a user 110, be built based on viewer history, or be imported (and modified) from triggers, settings and preferences, and recommendation keys included in a pre-categorized profile 220. Pre-loaded pre-categorized profiles 220 are associated with pre-set triggers and pre-set recommendation keys according to some aspects. According to aspects, a user profile 210 based on a pre-categorized profile 220 will include the pre-set triggers and recommendations keys from the pre-categorized profile 220 and will continue to be updated with new and modified triggers and recommendation keys as additional user interaction data is indexed and catalogued.

Other aspects allow the Profile Library 640 to be in communication with the backend/application server 124 to periodically update profiles. The updates may be based on a CDN-wide analysis of user profiles 210 stored by Profile Libraries 640 to provide more relevant pre-categorized profiles 220. The update may also include new recommendation keys for the user profiles 210, pre-categorized profiles 220, and subscriber profiles 230 as content item availability changes.

Settings and preferences in some aspects allow for the transition between users 110 on a single client 106 such that, for example, when user 110A has a user profile 210A that includes settings and preferences for a darker contrast on client 106 than the currently set contrast, the client 106 will automatically adjust the contrast to be darker when user profile 210A is the active profile. Similarly, for example, when user profile 210A includes settings and preferences for a set of "favorite channels" for rapid access on a client 106, the "favorite channels" will be set as indicated by user profile 210A when it is the active profile.

Recommendation keys in some aspects allow for a recommendation engine 128 to identify content items or advertisements to present to the user 110. For example, a user profile 210A based on the "sports nut" pre-categorized profile 220D would have recommendation keys for baseball, football, and soccer games, movies about sports teams, advertisements for sporting events, etc., so that the recommendation engine 128 can readily provide appropriate recommendations to the user 110A. The recommendation keys in some aspects may be given different weights by the profile engine 610 based on viewer history so that if, for example, user 110A is recommended baseball games, but does not accept the recommendations, the recommendation keys in user profile 210A (but not those in pre-categorized profile 220D) can be reduced in weight so that fewer baseball games are recommended to user 110A in the future. In another example, when the user 110A has rejected the "sports nut" pre-categorized profile 220D, but watches many soccer games, the Profile Engine 610 is operable to create or update a recommendation key to recommend more soccer games for the subscriber profile 230 or a user profile 210A (created with or without a pre-categorized profile 220 as a base).

Figure 7:
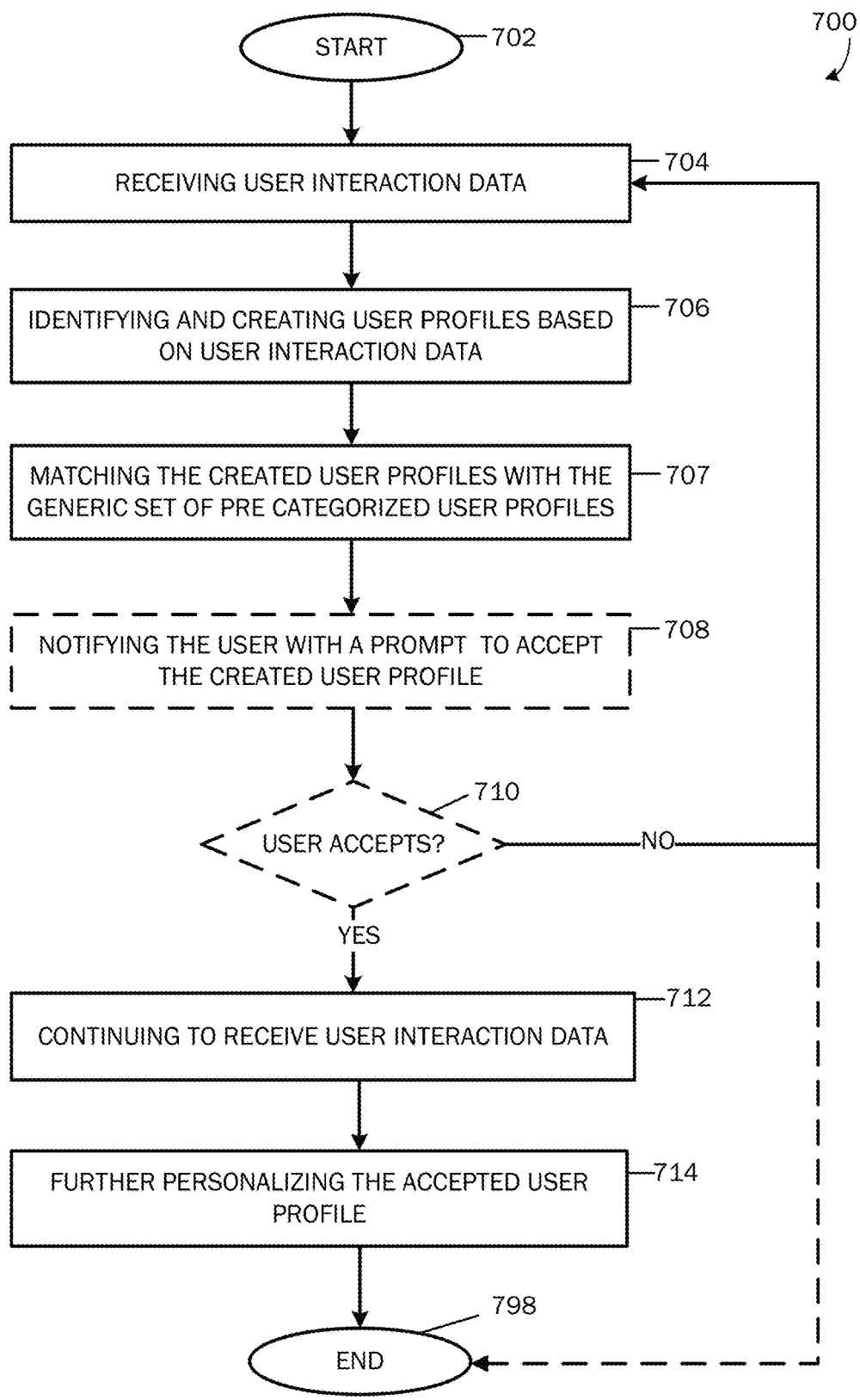
FIG. 7 is a flow chart of one example of a method for providing automatic identification and creation of user profiles.

FIG. 7 is a flow chart of one aspect of a method 700 for providing automatic identification and creation of user profiles 210. The method 700 starts at OPERATION 702 and continues to OPERATION 704, where user interaction data is received and collected. User interaction data comprises one or more of a user accessing and interacting with a personalized guide, selecting and viewing content, searching for shows, browsing various content items via a guide, channel surfing, choosing to provide feedback, accessing times for various different content items, etc. At OPERATION 706, unique user profiles 210 are identified and automatically created based on the user interaction data. The unique user profiles 210, identified and created in OPERATION 706, are matched against a plurality of generic pre-categorized profiles 220 available to the service provider in OPERATION 707. Once a matched pre-categorized profile 220 is determined for one or more user profiles 210, the method 700 proceeds to an optional OPERATION 708, wherein a user interface 310, as illustrated in FIG. 3, is provided to the user 110 for approval of the matched pre-categorized profile 220.

The method 700 proceeds to an optional DECISION OPERATION 710, wherein a user 110 accepts or rejects a suggested pre-categorized profile 220 identified by the system (i.e., a "match"). If at optional DECISION OPERATION 710, the user 110 does not accept the match, the method reverts to OPERATION 704, where it continues to collect user interaction data to identify and create unique user profiles 210. According to an aspect, the system takes the user rejection of the match to eliminate the match from a list of probable pre-categorized profiles 220 to be suggested to the user 110 in the future; the pre-categorized profile 220 is marked so that the user 110 will not be prompted to accept it again at a future confirmation.

According to yet another aspect, the user rejection of the match at optional DECISION OPERATION 710, received via user selection of option NO 320, as illustrated in FIG. 3, is considered to indicate user's 110 desire to not receive any further user profile recommendations. The user 110 is further provided with another user interface to confirm that the user 110 does not want the system to identify any further probable user profiles for the user 110. In that case, the method 700 ends at OPERATION 798.

If at optional DECISION OPERATION 710, the user 110 accepts the match, the method 700 proceeds to OPERATION 712, where the system establishes the accepted pre-categorized profile 220 and continues to collect user interaction data for the accepted pre-categorized profile 220. According to an aspect, at optional DECISION OPERATION 710, once the user accepts the match, another user interface, as illustrated in FIG. 5, is provided to allow the user 110 to further personalize the accepted pre-categorized profile 220.

The method 700 then proceeds to OPERATION 714, where the accepted pre-categorized profile 220 is further personalized based on the continuing collection of user interaction data at OPERATION 712 and recommendations for the specified user profile 210 are provided.

The method 700 ends at OPERATION 798.

Figure 8:
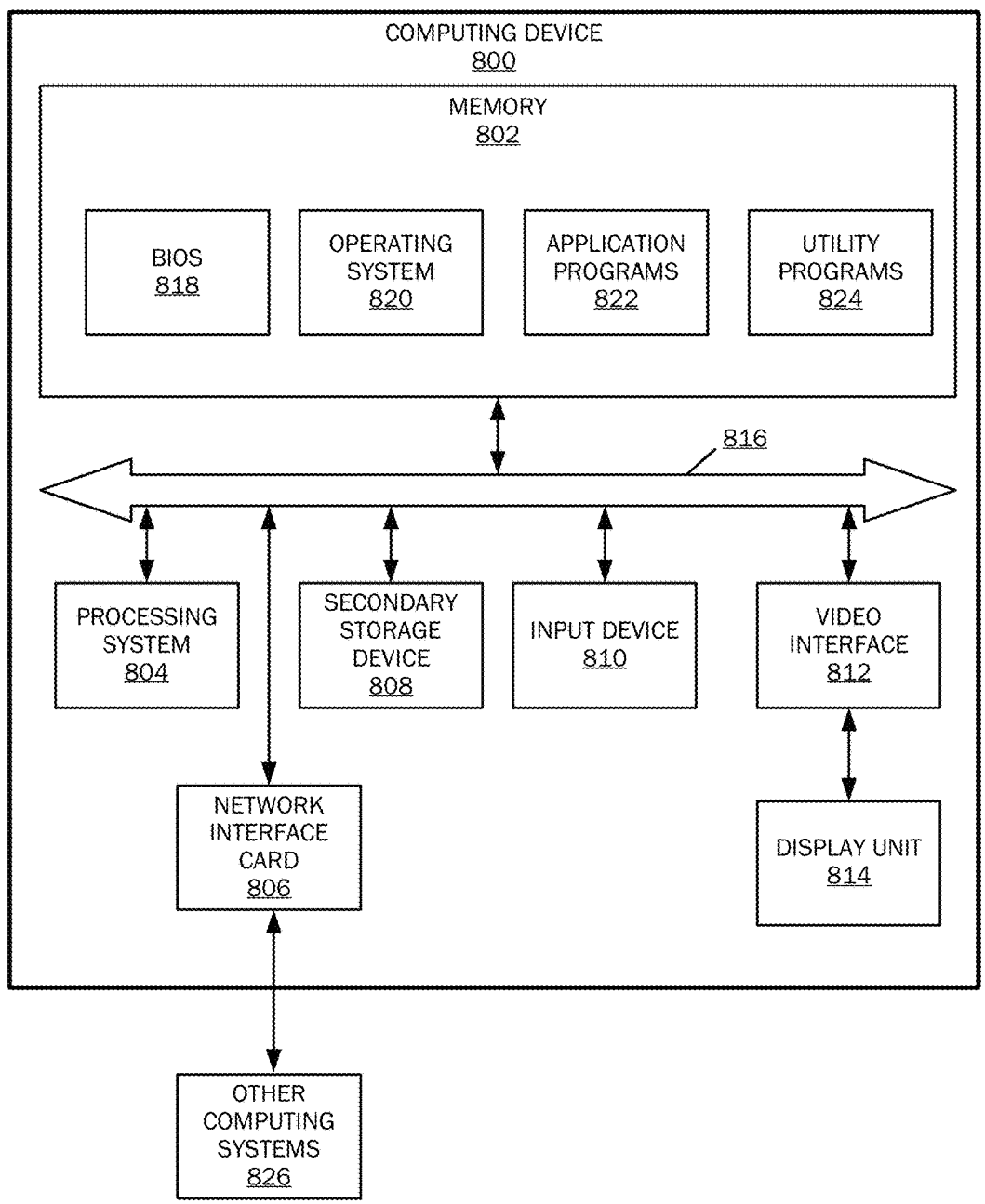
FIG. 8 is a block diagram illustrating example physical components of a computing device with which the various aspects of the invention are practiced.

FIG. 8 is a block diagram illustrating example physical components of a computing device 800 with which embodiments of the present invention may be practiced. In some embodiments, one or a combination of the components of the system 100 are implemented using one or more computing devices like the computing device 800. It should be appreciated that in other embodiments, one or a combination of the components of the system 100 may be implemented using computing devices having hardware components other than those illustrated in the example of FIG. 8.

Computing devices may be implemented in different ways in different embodiments. For instance, in the example of FIG. 8, the computing device includes a processing system 804, memory device 802, a network interface 806, a secondary storage device 808, an input device 810, a video interface 812, communicated with a display unit 814, and a communications medium 816. In other embodiments, the computing device 800 may be implemented using more or fewer hardware components or in combination with other types of computer systems and program modules. The memory device 802 includes one or more computer-readable storage media capable of storing data or computer-executable instructions that, when executed by processor 804, provide preset user group functionality as described herein.

The memory device 802 includes one or more computer-readable storage media capable of storing data or computer-executable instructions. Memory device 802 thus may store the computer-executable instructions that, when executed by processing system 804, automatically switching the user based on usage data as described with reference to FIGS. 1-7. In various embodiments, the memory device 802 is implemented in various ways. For example, the memory device 802 can be implemented as various types of computer-readable storage media. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

The term computer-readable media includes transmission media and computer-readable storage media. Transmission media includes communication and information delivery media. Computer-executable instructions, data structures, and program modules may be embodied on a transmission medium. For example, transmission media can include wired media, such as a wired network or direct-wired connection, and wireless media, such as acoustic, radio frequency (RF), infrared, and other wireless media.

The term computer-readable storage medium (and its plural: computer-readable storage media) refers to devices and articles of manufacture that store data or computer-executable instructions readable by a computing device. The term computer-readable storage medium does not include transmission media. The term computer-readable storage medium encompasses volatile and nonvolatile, and removable and non-removable media implemented in various methods or technologies for storage and retrieval of information. Such information can include data structures, program modules, computer-executable instructions, or other data.

The secondary storage device 808 includes one or more computer-readable storage media, and may store data and computer-executable instructions not directly accessible by the processing system 804. That is, the processing system 804 performs an I/O operation to retrieve data or computer-executable instructions from the secondary storage device 808. In various embodiments, the secondary storage device 808 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processing system 804 includes one or more processing units, which may include tangible integrated circuits that selectively execute computer-executable instructions. In various embodiments, the processing units in the processing system 804 are implemented in various ways. For example, the processing units in the processing system 804 can be implemented as one or more processing cores. In another example, the processing system 804 can comprise one or more separate microprocessors. In yet another example embodiment, the processing system 804 can comprise Application-Specific Integrated Circuits (ASICs) that provide specific functionality. In yet another example, the processing system 804 provides specific functionality by using an ASIC and by executing computer-executable instructions.

The computing device 800 may be enabled to send data to, and receive data from, a communication network via a network interface 806. In different embodiments, the network interface 806 is implemented in different ways, such as an Ethernet interface, a token-ring network interface, a fiber optic network interface, a wireless network interface (e.g., Wi-Fi, Wi-Max, etc.), or another type of network interface. The network interface 806 may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 810 enables the computing device 800 to receive input from a user. Example types of input devices include, but are not limited to: keyboards, mice, trackballs, stylus input devices, keypads, microphones, joysticks, touch-sensitive display screens, and other types of devices that provide user input to the computing device 800.

The video interface 812 outputs video information to the display unit 814. In different embodiments, the video interface 812 is implemented in different ways. For example, the video interface 812 may be a video expansion card. In another example, the video interface 812 is integrated into a motherboard of the computing device 800. In various embodiments, the display unit 814 can be an LCD display panel, a touch-sensitive display panel, an LED screen, a projector, a cathode-ray tube display, or another type of display unit. In various embodiments, the video interface 812 communicates with the display unit 814 in various ways. For example, the video interface 812 can communicate with the display unit 814 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 816 facilitates communication among the hardware components of the computing device 800. In different embodiments, the communications medium 816 facilitates communication among different components of the computing device 800. For instance, in the example of FIG. 8, the communications medium 816 facilitates communication among the memory device 802, the processing system 804, the network interface 806, the secondary storage device 808, the input device 810, and the video interface 812. In different embodiments, the communications medium 816 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

The memory device 802 stores various types of data or software instructions. For instance, in the example of FIG. 8, the memory device 802 stores a Basic Input/Output System (BIOS) 818 and an operating system 820. The BIOS 818 includes a set of software instructions that, when executed by the processing system 804, cause the computing device 800 to boot up. The operating system 820 includes a set of software instructions that, when executed by the processing system 804, cause the computing device 800 to provide an operating system that coordinates the activities and sharing of resources of the computing device 800. The memory device 802 also stores one or more application programs 822 that, when executed by the processing system 804, cause the computing device 800 to provide applications to users. The memory device 802 also stores one or more utility programs 824 that, when executed by the processing system 804, cause the computing device 800 to provide utilities to other software programs.

Embodiments of the present invention may be used in various distributed computing environments where tasks are performed by remote processing devices that are linked through a communications network in a distributed computing environment.

Figures 9A, 9B:
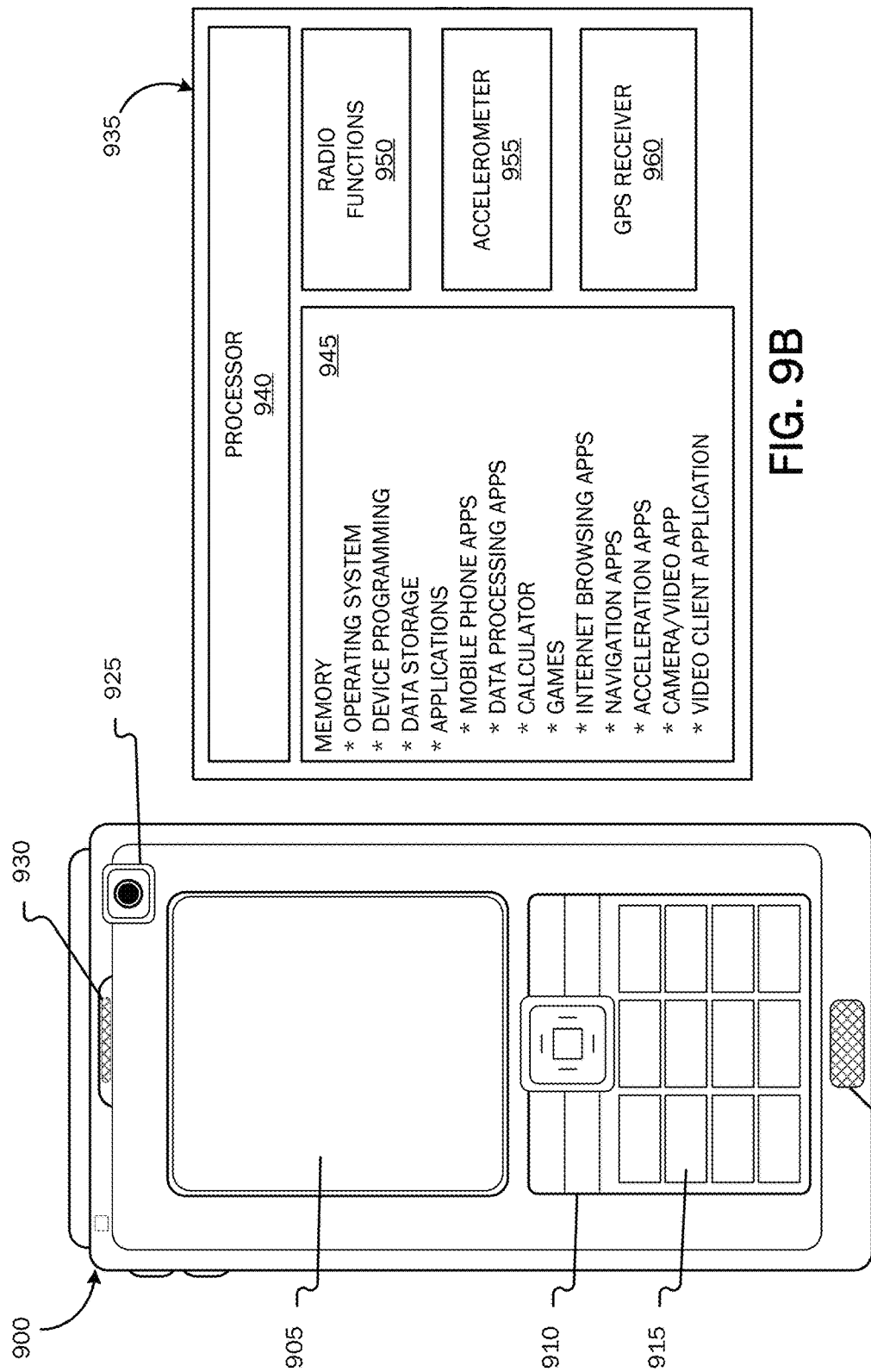
FIGS. 9A-9B illustrate a suitable mobile computing environment with which the various aspects of the invention are practiced.

FIGS. 9A and 9B illustrate a suitable mobile computing environment, for example, a mobile computing device 900 embodied as a mobile phone 106D, a tablet computing device 106B, a laptop computer 106C, and the like, with which embodiments may be practiced. The mobile computing device 900 is illustrative of any suitable device operative to send, receive and process wireless communications according to embodiments of the present invention. A display screen 905 is operative for displaying a variety of information such as information about incoming and outgoing communications, as well as, a variety of data and displayable objects, for example, text, alphanumeric data, photographs, and the like.

Data input to the mobile computing device 900 may be performed via a variety of suitable means, such as, touch screen input via the display screen 905, keyboard or keypad input via a data entry area 910, key input via one or more selectable buttons or controls 915, voice input via a microphone 918 disposed on the mobile computing device 900, photographic input via a camera 922 functionality associated with the mobile computing device, or any other suitable input means. Data may be output via the mobile computing device 900 via any suitable output means, including but not limited to, display on the display screen 905, audible output via an associated speaker 930 or connected earphone system, vibration module for providing tactile output, and the like.

Referring now to FIG. 9B, operational unit 935 is illustrative of internal operating functionality of the mobile computing device 900. A processor 940 is illustrative of a general purpose computer processor for processing incoming and outgoing data and communications and controlling operation of the device and associated software applications via a mobile computing device operating system. Memory 945 may be used for storing a device operating system, device programming, one or more stored applications, for example, mobile telephone applications, data processing applications, calculators, games, Internet browsing applications, navigation applications, acceleration applications, camera or video applications, etc.

Mobile computing device 900 may contain an accelerometer 955 for detecting acceleration, and can be used to sense orientation, vibration, or shock. Mobile computing device 900 may contain a global positioning system (GPS) subsystem (e.g., GPS send/receive functionality) 960. A GPS subsystem 960 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 950 include all required functionality, including onboard antennas, for allowing the mobile computing device 900 to communicate with other communication devices and systems via a wireless network. Radio functions 950 may be used to communicate with a wireless or WIFI-based positioning system to determine the location of a mobile computing device 900.

Figure 10:
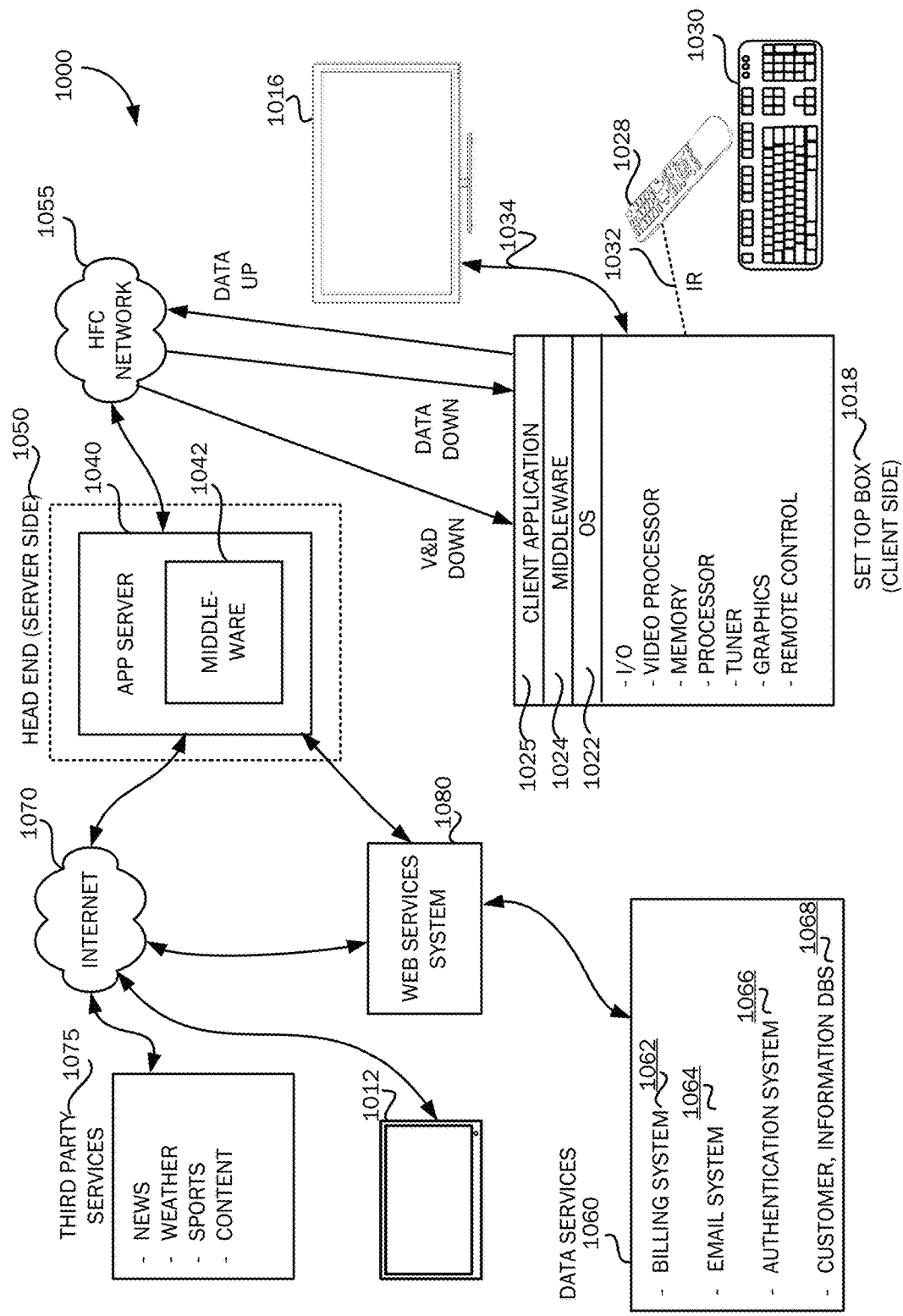
FIG. 10 is a block diagram illustrating one example of a cable television services system providing the various aspects of the invention.

FIG. 10 is a simplified block diagram illustrating one embodiment of a cable television services (CATV) system 1000 providing an operating environment. As can be appreciated, a CATV system 1000 is but one of various types of systems that may be used to provide the embodiments of the present invention. Referring now to FIG. 10, digital and analog video programming, information content and interactive television services are provided via a hybrid fiber coax (HFC) network 1055 to a television set 1016 for consumption by a CATV customer. As is known to those skilled in the art, HFC networks 1055 combine both optical fiber and coaxial cable lines. Typically, optical fiber runs from the cable head end 1050 to neighborhoods of subscribers. Coaxial cable runs from the optical fiber feeders to each customer or subscriber. The functionality of the HFC network 1055 allows for efficient bidirectional data flow between the client-side set-top box 1018 and a server-side application server 1040.

The CATV system 1000 is in the form of a distributed client-server computing system for providing video and data flow across the HFC network 1055 between server-side services providers (e.g., cable television/services providers) via a server-side head end 1050 and a client-side customer via STB 1018 in communication with a customer receiving device, such as the television set 1016. As is understood by those skilled in the art, modern CATV systems 1000 may provide a variety of services across the HFC network 1055 including traditional digital and analog video programming, telephone services, high speed Internet access, video-on-demand, and information services.

On the client side of the CATV system 1000, digital and analog video programming, and digital and analog data are provided to the customer television set 1016 via the STB 1018. Interactive television services that allow a customer to input data to the CATV system 1000 likewise are provided by the STB 1018. As illustrated in FIG. 10, the STB 1018 is a multipurpose computing device having a computer processor, memory, and an input/output mechanism. The input/output mechanism receives input from server-side processes via the HFC network 1055 and from customers via input devices such as the remote control device 1028, keyboard 1030, or other computing device, such as a tablet/slate computer, mobile computing device, etc. The remote control device 1028 and the keyboard 1030 may communicate with the STB 1018 via a suitable communication transport such as the infrared connection 1032. The STB 1018 also includes a video processor for processing and providing digital and analog video signaling to the television set 1016 via a cable communication transport 1034. A multi-channel tuner is provided for processing video and data to and from the STB 1018 and the server-side head end system 1050, described below.

The STB 1018 also includes an operating system 1022 for directing the functions of the STB 1018 in conjunction with a variety of client applications 1025. For example, if a client application 1025 requires a news flash from a third-party news source to be displayed on the television set 1016, the operating system 1022 may cause the graphics functionality and video processor of the STB 1018, for example, to output the news flash to the television set 1016 at the direction of the client application 1025 responsible for displaying news items.

Because a variety of different operating systems 1022 may be used by a variety of different brands and types of set-top boxes 1018, a middleware layer 1024 may be provided to allow a given software application to be executed by a variety of different operating systems 1022. According to an aspect, the middleware layer 1024 may include a set of application programming interfaces (APIs) that are exposed to client applications 1025 and operating systems 1022 that allow the client applications to communicate with the operating systems 1022 through common data calls understood via the API set. As described below, a corresponding middleware layer 1042 is included on the server side of the CATV system 1000 for facilitating communication between the server-side application server 1040 and the client-side STB 1018. The middleware layer 1042 of the server-side application server 1040 and the middleware layer 1024 of the client-side STB 1018 may format data passed between the client side and server side according to the Extensible Markup Language (XML).

According to one aspect, the STB 1018 passes digital and analog video and data signaling to the television set 1016 via a one-way cable communication transport 1034. According to other aspects, two-way communication transports may be used, for example, via high definition multimedia (HDMI) ports. The STB 1018 may receive video and data from the server side of the CATV system 1000 via the HFC network 1055 through a video/data downlink and data via a data downlink. The STB 1018 may transmit data from the client side of the CATV system 1000 to the server side of the CATV system 1000 via the HFC network 1055 via one data uplink. The video/data downlink is an "in band" downlink that allows for digital and analog video and data signaling from the server side of the CATV system 1000 through the HFC network 1055 to the STB 1018 for use by the STB 1018 and for distribution to the television set 1016. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 10, between the HFC network 1055 and the STB 1018 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side STB 1018 and the server-side application server 1040 is typically passed through the "out of band" data links. Alternatively, an "in band" data carousel may be positioned in an "in band" channel into which a data feed may be processed from the server-side application server 1040 through the HFC network 1055 to the client-side STB 1018. Operation of data transport between components of the CATV system 1000, described with reference to FIG. 10, is well known to those skilled in the art.

Referring still to FIG. 10, the head end 1050 of the CATV system 1000 is positioned on the server side of the CATV system 1000 and includes hardware and software systems responsible for originating and managing content for distributing through the HFC network 1055 to client-side STBs 1018 for presentation to customers via television sets 1016. As described above, a number of services may be provided by the CATV system 1000, including digital and analog video programming, interactive television services, telephone services, video-on-demand services, targeted advertising, and provision of information content.

The application server 1040 is a computing system operative to assemble and manage data sent to and received from the client-side STB 1018 via the HFC network 1055. As described above with reference to the STB 1018, the application server 1040 includes a middleware layer 1042 for processing and preparing data from the head end 1050 of the CATV system 1000 for receipt and use by the client-side STB 1018. For example, the application server 1040 via the middleware layer 1042 may obtain data from third-party services 1075 via the Internet 1070 for transmitting to a customer through the HFC network 1055 and the STB 1018. For example, content data and metadata of a third party service 1075 may be downloaded by the application server 1040 via the Internet 1070. When the application server 1040 receives the downloaded third party services 1075, the middleware layer 1042 may be used to format the content metadata for receipt and use by the STB 1018. Therefore, content metadata may be sent and categorized based on the availability to the customer's program guide data According to one aspect, data obtained and managed by the middleware layer 1042 of the application server 1040 is formatted according to the Extensible Markup Language and is passed to the STB 1018 through the HFC network 1055 where the XML-formatted data may be used by a client application 1025 in concert with the middleware layer 1024, as described above. As should be appreciated by those skilled in the art, a variety of third-party services data 1075, including news data, weather data, sports data and other information content may be obtained by the application server 1040 via distributed computing environments such as the Internet 1070 for provision to customers via the HFC network 1055 and the STB 1018. Similarly, content (e.g., Internet television content and other internet protocol video-based content) is displayed to the customer on the user's client device 1012.

According to aspects, the application server 1040 obtains customer support services data, including billing data, information on customer work order status, answers to frequently asked questions, services provider contact information, and the like from data services 1060 for provision to the customer via an interactive television session. As illustrated in FIG. 10, the services provider data services 1060 include a number of services operated by the services provider of the CATV system 1000, which may include data on a given customer.

A billing system 1062 may include information such as a customer's name, street address, business identification number, Social Security number, credit history, and information regarding services and products subscribed to by the customer. According to aspects, the billing system 1062 may also include billing data for services and products subscribed to by the customer for bill processing, billing presentment and payment receipt.

An email system 1064 may include information such as user accounts, address books, archived messages, subscriber profiles, subscribers IDs, and passwords used by customers for access to electronic mail services.

An authentication system 1066 may include information such as secure user names, subscriber profiles, subscriber IDs, and passwords used by customers for access to network services.

A customer information database 1068 may include general information about customers such as place of employment, business address, business telephone number, and demographic information such as age, gender, educational level, and the like. The customer information database 1068 may also include information on pending work orders for services or products ordered by the customer. The customer information database 1068 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 1062, 1064, 1066, 1068 may be integrated or provided in any combination of separate systems, wherein FIG. 10 shows only one example.

Referring still to FIG. 10, web services system 1080 is illustrated between the application server 1040 and the data services 1060. According to aspects, web services system 1080 serves as a collection point for data requested from each of the disparate data services systems comprising data services 1060. According to aspects, when the application server 1040 requires customer services data from one or more of the data services 1060, the application server 1040 passes a data query to the web services system 1080. The web services system formulates a data query to each of the available data services systems 1060 for obtaining any required data for a requesting customer as identified by an STB-identification associated with the customer. The web services system 1080 serves as an abstraction layer between the various data services systems 1060 and the application server 1040. That is, the application server 1040 is not required to communicate with the disparate data services systems 1060, nor is the application server 1040 required to understand the data structures or data types used by the disparate data services systems 1060. The web services system 1080 is operative to communicate with each of the disparate data services systems 1060 for obtaining necessary customer data. The customer data obtained by the web services system 1080 is assembled and is returned to the application server 1040 for ultimate processing via the middleware layer 1042, as described above.

Embodiments the invention may be used in combination with any number of computer systems, such as in desktop environments, laptop or notebook computer systems, multiprocessor systems, micro-processor based or programmable consumer electronics, networked PCs, mini computers, mainframe computers, mobile communication device systems and the like. Embodiments of the present invention may be used in various distributed computing environments where tasks are performed by remote processing devices that are linked through a communications network in a distributed computing environment, and where programs may be located in both local and remote memory storage.

Embodiments, for example, are described above with reference to block diagrams or operational illustrations of methods, systems, and computer program products according to embodiments. The functions/acts noted in the blocks may occur out of the order as shown in any flowchart or described herein with reference to the figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering, inserting, or deleting a step or process, without departing from the embodiments.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing automatic identification and creation of user profiles, the method comprising:
responsive to detecting user access to a subscriber account under a common subscriber profile:
receiving user interaction data;
categorizing a currently-viewed content item;

indexing the categorized content item and the received user interaction data;
analyzing the indexed content item and user interaction data to identify a viewing pattern through trend analysis, the viewing pattern including historical user interaction data and historical content item data;
when the viewing pattern has been identified, creating a unique user profile separate from the common subscriber profile based on the identified viewing pattern, wherein the unique user profile includes:
  a trigger, wherein the trigger identifies future user interaction data corresponding to the historical user interaction data;
  settings and preferences data; and
  recommendation data based on the historical content item data; and
in response to receiving the future user interaction data identified by the trigger, setting the unique user profile for use as an active profile for a client by applying the settings and preferences data and providing content items based on the recommendation data.

2. The method of claim 1, further comprising:
in response to identifying the viewing pattern, matching the unique user profile to a pre-categorized profile associated with the viewing pattern, wherein the pre-categorized profile includes a pre-set trigger and pre-set recommendation data;
requesting a confirmation of the pre-categorized profile for inclusion in the unique user profile; and
when the pre-categorized profile is confirmed for inclusion in the unique user profile, including the pre-set trigger and the pre-set recommendation data in the unique user profile.

3. The method of claim 2, further comprising:
when the pre-categorized profile is not confirmed for inclusion in the unique user profile,
  not including the pre-set trigger and the pre-set recommendation data in the unique user profile; and
  marking the pre-categorized profile to prevent requesting a future confirmation of the pre-categorized profile for inclusion in the unique user profile.

4. The method of claim 1, wherein the unique user profile is a user-defined profile.

5. The method of claim 1, wherein the common subscriber profile is a default active profile on the client.

6. The method of claim 1, wherein setting the unique user profile for use as the active profile for the client causes a change in the active profile on the client.

7. The method of claim 1, further comprising:
in response to identifying a second viewing pattern, the second viewing pattern including second historical user interaction data and second historical content item data, determining whether to create a second unique user profile;
when it is determined to create the second unique user profile, creating the second unique user profile, the second unique user profile including a trigger identifying future user interaction data corresponding to the second historical user interaction data, settings and preferences data, and recommendation data based on the second historical content item data; and
when it is determined to not create the second unique user profile, updating the unique user profile to include the trigger identifying the future user interaction data corresponding to the second historical user interaction data and the recommendation data based on the second historical content item data.

8. The method of claim 1, further comprising:
when the unique user profile has been set for use as the active profile for the client:
  receiving second user interaction data;
  categorizing the currently-viewed content item;
  indexing the categorized content item with the second user interaction data;
  matching the received second user interaction data against the trigger of the unique user profile;
  when the received second user interaction data matches the trigger, maintaining the unique user profile as the active profile for the client;
  when the received second user interaction data does not match the trigger, matching the received second user interaction data against a trigger of a different unique user profile;
  when the received second user interaction data matches the trigger of the different unique user profile, setting the different unique user profile as the active profile for the client; and
  when the received second user interaction data does not match the trigger of the different unique user profile, maintaining the unique user profile as the active profile for the client.

9. A system for automatically providing user profiles for providing a personalized user experience, comprising:
a processor; and
a memory storage including instructions, which when executed by the processor are operable to provide:
  a user action interpreter, operable to receive a user interaction and parse data from a client to categorize a currently-viewed content item while a subscriber account is being accessed under a common subscriber profile;
  a history database, operable to index the parsed data to build a viewer history;
  a profile library, operable to store a plurality of profiles including at least the common subscriber profile and one or more unique profiles for the subscriber account, wherein each unique profile is created based on a respective viewer history for which a distinct viewing pattern was identified through trend analysis and includes a triggering user interaction; and
  a profile engine, operable to select one of the one or more unique profiles in response to receiving a user interaction matching the triggering user interaction corresponding to the unique profile, and change an active profile for the client to the selected unique profile.

10. The system of claim 9, wherein the profile engine is further operable to transmit the selected unique profile to the client.

11. The system of claim 9, wherein the active profile defaults to the common subscriber profile when no profile is selected by the profile engine.

12. The system of claim 9, wherein the plurality of profiles include a pre-categorized profile, wherein the pre-categorized profile includes a pre-set triggering user interaction.

13. The system of claim 12, wherein the profile engine is further operable to create a new unique user profile, wherein the new unique user profile is based on a matched pre-categorized profile from the plurality of profiles, wherein the matched pre-categorized profile is matched based on the viewer history.

14. The system of claim 12, wherein the profile engine is further operable to prompt the client for an acceptance of a matched pre-categorized profile, wherein the user action interpreter is further operable to receive the acceptance of the matched pre-categorized profile; and when the acceptance has been received, the profile engine is further operable to create a new unique user profile, wherein the new unique user profile is based on the matched pre-categorized profile from the plurality of profiles, wherein the matched pre-categorized profile is matched based on the viewer history.

15. The system of claim 14, wherein the acceptance has not been received, the profile engine is further operable to reject the matched pre-categorized profile as a future matched pre-categorized profile.

16. A system for providing automatic identification and creation of user profiles, the system comprising:
   a processor; and
   a memory storage including instructions, which when executed by the processor are operable to:
      responsive to a detection of user access to a subscriber account under a common subscriber profile:
         receive user interaction data;
         identify a currently-viewed content item, based on metadata associated with the currently-viewed content item;
         categorize the user interaction data in association with the currently-viewed content item;
         build a viewer history based on the categorized user interaction data;
         analyze the viewer history to identify a plurality of unique users associated with the subscriber account through trend analysis;
      when the plurality of unique users have been identified, create a unique user profile separate from the common subscriber profile for each of the plurality of unique users based on the viewer history;
      match each unique user profile to a pre-categorized profile from a set of available pre-categorized profiles, wherein each unique profile includes a pre-set trigger identifying future user interaction data and a personalized user interface based on the respective pre-categorized profile; and
      in response to receiving the future user interaction data identified by the pre-set trigger corresponding to a particular unique profile, setting the particular unique user profile for use as an active profile for a client by providing the personalized user interface for the particular unique user profile based on the respective pre-categorized profile.

17. The system of claim 16, when each unique user profile has been matched to the pre-categorized profile from the set of available pre-categorized profiles:
   request an acceptance of the matched pre-categorized profile for use with the unique user profile;
   when the acceptance of the matched pre-categorized profile is received, create the unique user profile corresponding to the matched pre-categorized profile; and
   when a rejection of the matched pre-categorized profile is received, match the unique user profile to a different pre-categorized profile from the set of available pre-categorized profiles.

18. The system of claim 16, further operable to:
   associate the viewer history with the common subscriber profile, wherein the common subscriber profile is a default profile; and
   build a unique viewer history corresponding to each unique user profile to update the personalized user interface based on the respective unique user profile, wherein the unique viewer history is based on the categorized user interaction data received while providing the personalized user interface for the respective unique user profile.

19. The system of claim 16, further operable to:
   determine whether user interaction data associated with a second unique user profile is received while providing the personalized user interface for a first unique user profile; and
   when the user interaction data associated with the second unique user profile is received while providing the personalized user interface for the first unique user profile, switch from providing the personalized user interface for the first unique user profile to providing the personalized user interface for the second unique user profile.

* * * * *